US012802079B2

(12) United States Patent
Muhammad et al.

(10) Patent No.: US 12,802,079 B2
(45) Date of Patent: Nov. 17, 2026

(54) SYSTEM, METHOD, AND COMPUTER PROGRAM FOR SUBSCRIPTION CANCELLATION

(71) Applicant: JPMorgan Chase Bank, N.A., New York, NY (US)

(72) Inventors: Ammar Muhammad, Los Angeles, CA (US); Reetu Raj Bok, Philadelphia, PA (US); Alisa Hermann, New York, NY (US); Jonathan Rosner, White Plains, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 102 days.

(21) Appl. No.: 18/750,646

(22) Filed: Jun. 21, 2024

(65) Prior Publication Data

US 2025/0005586 A1 Jan. 2, 2025

Related U.S. Application Data

(60) Provisional application No. 63/524,123, filed on Jun. 29, 2023.

(51) Int. Cl.
*G06Q 20/40* (2012.01)

(52) U.S. Cl.
CPC .................................. *G06Q 20/407* (2013.01)

(58) Field of Classification Search
CPC .... G06Q 20/407; G06Q 20/322; G06Q 20/36; G06Q 30/0613; G06Q 20/102; G06Q 30/0631
See application file for complete search history.

(56) References Cited

U.S. PATENT DOCUMENTS 10,963,589 B1 * 3/2021 Fakhraie ............... H04L 63/101
11,935,020 B1 * 3/2024 Fakhraie ............... H04L 63/102
2010/0161457 A1 * 6/2010 Katz ...................... G06Q 40/02 709/204

(Continued)

OTHER PUBLICATIONS

"What are recurring charges and how do they work?" by Capital One. Accessed at: https://www.capitalone.com/learn-grow/money-management/recurring-charges/. (Year: 2023).*

(Continued)

*Primary Examiner* — John S. Wasaff
(74) *Attorney, Agent, or Firm* — GREENBLUM & BERNSTEIN, P.L.C.

(57) ABSTRACT

Various methods, apparatuses/systems, and media for cancelling online subscription are disclosed. A processor grants an access to a customer's card subscription payment details data received from a database to a mobile operating system embedded within a mobile device of a customer The processor calls a first API to retrieve and display a list of merchants with active subscriptions tied to the customer's card to cancel a corresponding active subscription; and calls a second API to allow cancellation of the corresponding active subscription. The processor receives an input via the GUI to select a merchant associated with the corresponding active subscription the customer wants to cancel; and cancels the corresponding active subscription associated with the selected merchant.

17 Claims, 9 Drawing Sheets

800

(56) References Cited

U.S. PATENT DOCUMENTS

| | | | | |
|---|---|---|---|---|
| 2012/0265683 | A1* | 10/2012 | da Silva | G06Q 20/407 705/44 |
| 2013/0080318 | A1* | 3/2013 | Katz | G06Q 40/02 705/39 |
| 2013/0124395 | A1* | 5/2013 | Siminoff | G06Q 20/405 705/39 |
| 2018/0336557 | A1* | 11/2018 | Khurana | G06Q 20/405 |
| 2018/0341999 | A1* | 11/2018 | Awan | G06Q 30/0617 |
| 2019/0205882 | A1* | 7/2019 | Rosano | G06Q 20/22 |
| 2020/0184434 | A1 | 6/2020 | Evans et al. | |
| 2021/0400147 | A1* | 12/2021 | Benkreira | H04W 4/24 |
| 2022/0245641 | A1 | 8/2022 | Wintle et al. | |
| 2022/0300921 | A1 | 9/2022 | Book et al. | |
| 2023/0206195 | A1* | 6/2023 | Benkreira | G06Q 20/4016 705/40 |

OTHER PUBLICATIONS

“Change an automatic payment” by Chase. Accessed via Wayback Machine at https://web.archive.org/web/20220727201432/https://www.chase.com/digital/customer-service/helpful-tips/credit-cards/mobile/change-autopay. Jul. 27, 2022. (Year: 2022).*

Official Communication Received in European Patent Application No. 24185307.6, dated Jan. 9, 2025.

Anonymous: “Apple Pay—Wikipedia”, XP093236685, Retrieved from the Internet: URL: https://en.wikipedia.org/w/index.php?title=Apple_Pay&oldid=1156094251, dated May 16, 2023.

* cited by examiner

200

300

500

600a

600b

600c

800

SYSTEM, METHOD, AND COMPUTER PROGRAM FOR SUBSCRIPTION CANCELLATION

CROSS-REFERENCE TO RELATED APPLICATIONS

This application claims the benefit of priority from U.S. Provisional Patent Application No. 63/524,123, filed Jun. 29, 2023, which is herein incorporated by reference in its entirety.

TECHNICAL FIELD

This disclosure generally relates to cancellation of online subscription, and, more particularly, to methods and apparatuses for implementing a platform, cloud, and language agnostic subscription cancellation module configured to allow a user to cancel subscriptions in a consistent and seamless manner irrespective of how the subscription was signed up (i.e., via Appstore or via merchant site).

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

A wide variety of business functions are commonly supported by software applications and tools, i.e., business process repository tools. For instance, software application has been directed to online subscription, data monitoring, performance analysis, project tracking, and competitive analysis, to name but a few.

Today, a lot of customers use mobile device and have multiple online subscriptions. Customer who subscribes for a subscription from his/her mobile device's application store (i.e., Apple Appstore) may easily cancel it by going to "settings" page of their mobile device. But customers who sign up for a subscription directly with the merchant (without going through Appstore) "may not" cancel their subscription by going to the "settings" page. This may prove to be a customer problem because customers are unable to cancel subscriptions that were signed up from merchant application by going to his/her mobile device's "settings" page. For example, customer has to log in to the merchant application to cancel the subscription. Moreover, in few cases, some merchants may not allow online cancellation requiring customers to call servicing (i.e., direct phone call or chat box) to get their subscription cancelled which may prove to be time consuming and frustrating.

SUMMARY

The present disclosure, through one or more of its various aspects, embodiments, and/or specific features or sub-components, provides, among other features, various systems, servers, devices, methods, media, programs, and platforms for implementing a platform, cloud, and language agnostic subscription cancellation module configured to allow a user to cancel subscriptions from the user's mobile device, such as "settings" page, or "wallet" page, in a consistent and seamless manner irrespective of how the subscription was signed up (i.e., via Appstore or via merchant site), but the disclosure is not limited thereto.

In some embodiments, a method for cancelling online subscription by utilizing one or more processors along with allocated memory is disclosed. The method may include: providing a database that stores a customer's card subscription payment details data associated with online subscriptions with one or more merchants; granting access to the customer's card subscription payment details data from the database to a mobile operating system embedded within a mobile device of the customer; calling, in response to granting the access, a first application programming interface received from the mobile operating system to retrieve and display a list of merchants with active subscriptions tied to the customer's card onto a graphical user interface within the customers' mobile device to cancel a corresponding active subscription; calling, in response to granting the access, a second application programming interface received from the mobile operating system to allow cancellation of the corresponding active subscription; receiving an input via the graphical user interface to select a merchant associated with the corresponding active subscription the customer wants to cancel; and cancelling, in response to receiving the input, the corresponding active subscription associated with the selected merchant.

In some embodiments, the customer may sign up for the online subscription directly from a merchant website associated with the merchant without going through an Appstore.

In some embodiments, in granting the access to the customer's card subscription payment details data, the method may further include: adding the customer's card to a mobile wallet of the operating system.

In some embodiments, the method may further include: receiving an acknowledgement message via the mobile device that the customer's card may be successfully added to the mobile wallet with an opt-in option that allows sharing the customer's subscription details data tied to the customer's card with the operating system; and receiving an input that the customer selected the opt-in option.

In some embodiments, the method may further include: displaying on to the graphical user interface, in response to receiving the input to select the merchant whose subscription the customer wants to cancel, a cancelled workflow.

In some embodiments, the method may further include: calling, in response to the cancelled workflow, a third application programming interface received from the mobile operating system to recommend that the customer subscribe to other subscriptions provided by other merchants based on analyzing deals data related to the customer card and customer transaction habits data and demographics data retrieved from the database.

In some embodiments, the method may further include: integrating the customer's mobile device to a third party subscription cancellation provider platform; receiving, in response to integrating, an input via the graphical user interface to select the merchant associated with the corresponding active subscription the customer wants to cancel; and cancelling, in response to receiving the input, the corresponding active subscription associated with the selected merchant utilizing the third party subscription cancellation provider platform, but the disclosure is not limited thereto.

For example, in some embodiments, the method may further include: implementing the subscription cancellation module in such a manner to put the card provider in the middle rather than the customer's mobile device integrating directly with the third party subscription cancellation provider platform. Furthermore, in some embodiments, in the method, the card provider may be configured to decide if it wants to call the third party subscription cancellation provider platform or network APIs to connect to the network services for subscription cancellation or block the transaction internally based on the merchant and use case.

For example, in some embodiments, when cancellation of subscription fails due to unable to reach the merchant via the uniform resource locator link, the method may further include: implementing a rule or token to block future payments from the customer card for the merchant.

In some embodiments, a system for cancelling online subscription is disclosed. The system may include: a processor; and a memory operatively connected to the processor via a communication interface, the memory storing computer readable instructions, when executed, may cause the processor to: provide a database that stores a customer's card subscription payment details data associated with online subscriptions with one or more merchants; grant access to the customer's card subscription payment details data from the database to a mobile operating system embedded within a mobile device of the customer; call, in response to granting the access, a first application programming interface received from the mobile operating system to retrieve and display a list of merchants with active subscriptions tied to the customer's card onto a graphical user interface within the customers' mobile device to cancel a corresponding active subscription; call, in response to granting the access, a second application programming interface received from the mobile operating system to allow cancellation of the corresponding active subscription; receive an input via the graphical user interface to select a merchant associated with the corresponding active subscription the customer wants to cancel; and cancel, in response to receiving the input, the corresponding active subscription associated with the selected merchant.

In some embodiments, in granting the access to the customer's card subscription payment details data, the processor may be further configured to: add the customer's card to a mobile wallet of the operating system.

In some embodiments, the processor may be further configured to: receive an acknowledgement message via the mobile device that the customer's card successfully added to the mobile wallet with an opt-in option that allows sharing the customer's subscription details data tied to the customer's card with the operating system; and receive an input that the customer selected the opt-in option.

In some embodiments, the processor may be further configured to: display on to the graphical user interface, in response to receiving the input to select the merchant whose subscription the customer wants to cancel, a cancelled workflow.

In some embodiments, the processor may be further configured to: call, in response to the cancelled workflow, a third application programming interface received from the mobile operating system to recommend that the customer subscribe to other subscriptions provided by other merchants based on analyzing deals data related to the customer card and customer transaction habits data and demographics data retrieved from the database.

In some embodiments, the processor may be further configured to: integrate the customer's mobile device to a third party subscription cancellation provider platform; receive, in response to integrating, an input via the graphical user interface to select the merchant associated with the corresponding active subscription the customer wants to cancel; and cancel, in response to receiving the input, the corresponding active subscription associated with the selected merchant utilizing the third party subscription cancellation provider platform, but the disclosure is not limited thereto.

For example, in some embodiments, the processor may be further configured to implement the subscription cancellation module in such a manner to put the card provider in the middle rather than the customer's mobile device integrating directly with the third party subscription cancellation provider platform. Furthermore, in some embodiments, the card provider may be configured to decide if it wants to call the third party subscription cancellation provider platform or network APIs to connect to the network services for subscription cancellation or block the transaction internally based on the merchant and use case.

For example, in some embodiments, when cancellation of subscription fails due to unable to reach the merchant via the uniform resource locator link, the processor may be further configured to: implement a rule or token to block future payments from the customer card for the merchant.

In some embodiments, a non-transitory computer readable medium configured to store instructions for cancelling online subscription is disclosed. The instructions, when executed, may cause a processor to perform the following: providing a database that stores a customer's card subscription payment details data associated with online subscriptions with one or more merchants; granting access to the customer's card subscription payment details data from the database to a mobile operating system embedded within a mobile device of the customer; calling, in response to granting the access, a first application programming interface received from the mobile operating system to retrieve and display a list of merchants with active subscriptions tied to the customer's card onto a graphical user interface within the customers' mobile device to cancel a corresponding active subscription; calling, in response to granting the access, a second application programming interface received from the mobile operating system to allow cancellation of the corresponding active subscription; receiving an input via the graphical user interface to select a merchant associated with the corresponding active subscription the customer wants to cancel; and cancelling, in response to receiving the input, the corresponding active subscription associated with the selected merchant.

In some embodiments, in granting the access to the customer's card subscription payment details data, the instructions, when executed, may cause the processor to further perform the following: adding the customer's card to a mobile wallet of the operating system.

In some embodiments, the instructions, when executed, may cause the processor to further perform the following: receiving an acknowledgement message via the mobile device that the customer's card may be successfully added to the mobile wallet with an opt-in option that allows sharing the customer's subscription details data tied to the customer's card with the operating system; and receiving an input that the customer selected the opt-in option.

In some embodiments, the instructions, when executed, may cause the processor to further perform the following: displaying on to the graphical user interface, in response to receiving the input to select the merchant whose subscription the customer wants to cancel, a cancelled workflow.

In some embodiments, the instructions, when executed, may cause the processor to further perform the following: calling, in response to the cancelled workflow, a third application programming interface received from the mobile operating system to recommend that the customer subscribe to other subscriptions provided by other merchants based on analyzing deals data related to the customer card and customer transaction habits data and demographics data retrieved from the database.

In some embodiments, the instructions, when executed, may cause the processor to further perform the following: integrating the customer's mobile device to a third party subscription cancellation provider platform; receiving, in response to integrating, an input via the graphical user interface to select the merchant associated with the corresponding active subscription the customer wants to cancel; and cancelling, in response to receiving the input, the corresponding active subscription associated with the selected merchant utilizing the third party subscription cancellation provider platform, but the disclosure is not limited thereto.

In some embodiments, the instructions, when executed, may cause the processor to implement the subscription cancellation module in such a manner to put the card provider in the middle rather than the customer's mobile device integrating directly with the third party subscription cancellation provider platform. Furthermore, in some embodiments, the card provider may be programmed in a manner to decide if it wants to call the third party subscription cancellation provider platform or network APIs to connect to the network services for subscription cancellation or block the transaction internally based on the merchant and use case.

In some embodiments, when cancellation of subscription fails due to unable to reach the merchant via the uniform resource locator link, the instructions, when executed, may cause the processor to further perform the following: implementing a rule or token to block future payments from the customer card for the merchant.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
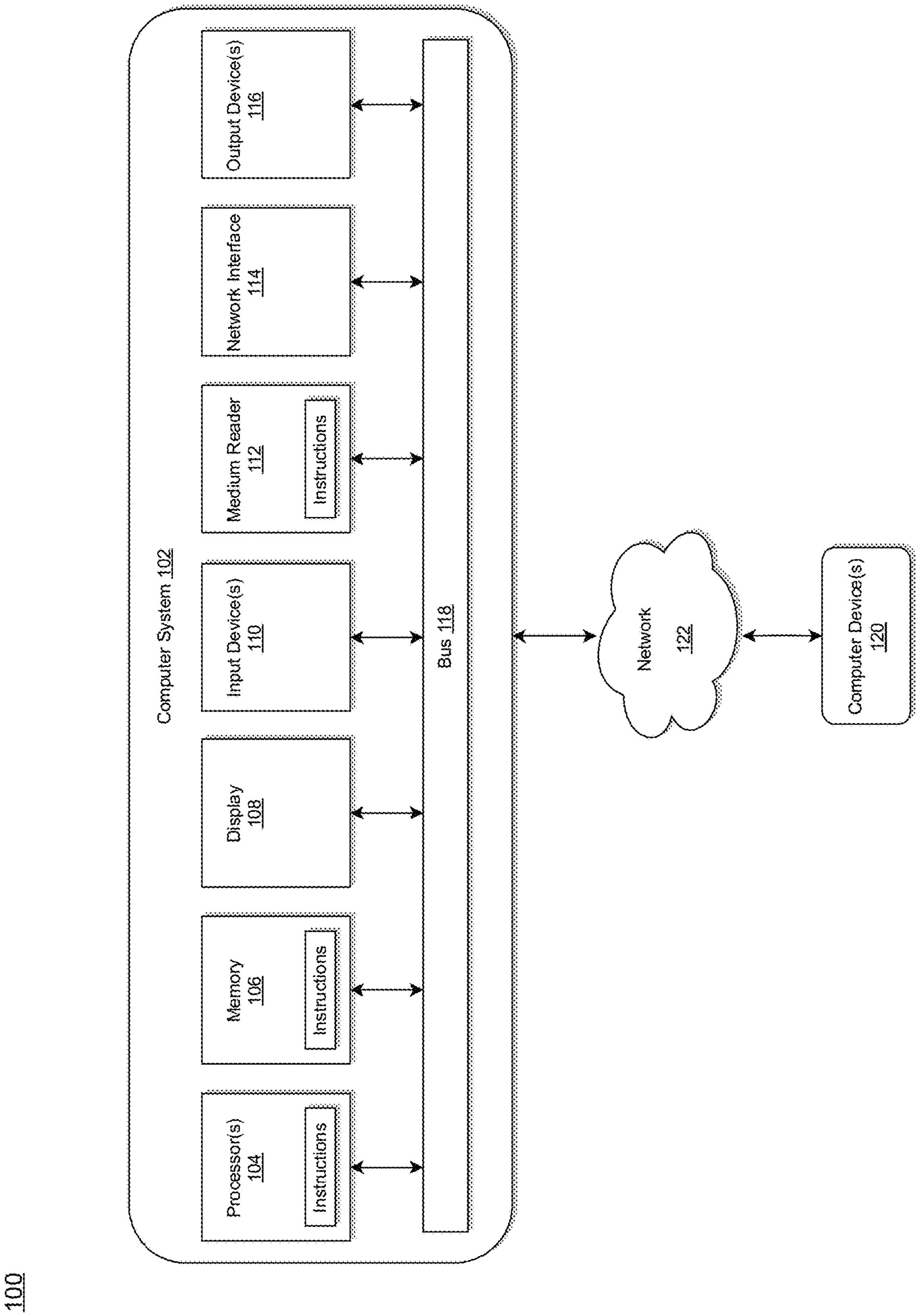
FIG. 1 illustrates a computer system for implementing a platform, cloud, and language agnostic subscription cancellation module configured to allow a user to cancel subscriptions in a consistent and seamless manner irrespective of how the subscription was signed up in accordance with an embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is a system 100 for use in implementing a platform, cloud, and language agnostic subscription cancellation module that may be configured for allowing a user to cancel subscriptions from the user's mobile device "settings" page in a consistent and seamless manner irrespective of how the subscription was signed up (i.e., via Appstore or via merchant site) in accordance with the embodiments described herein. The system 100 is generally shown and may include a computer system 102, which is generally indicated.

The computer system 102 may include a set of instructions that may be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that may store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions may be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, may be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In some embodiments, the subscription cancellation module may be platform, language, database, and cloud agnostic that may allow for consistent easy orchestration and passing of data through various components to output a desired result. Since the disclosed process, in some embodiments, is platform, language, database, and cloud agnostic, the subscription cancellation module may be independently tuned or modified for optimal performance without affecting the configuration or data files. The configuration or data files, in some embodiments, may be written using JSON, but the disclosure is not limited thereto. For example, the configuration or data files may easily be extended to other readable file formats such as XML, YAML, etc., or any other configuration-based languages. For example, the data files may easily be extended to other files formats such as CSV, RDF, OWL, etc., or any other structured, semi-structured, or unstructured format.

In accordance with various embodiments of the present disclosure, the methods described herein may be implemented using a hardware computer system that executes software programs. Further, in a, non-limited embodiment, implementations may include distributed processing, component/object distributed processing, and an operation mode having parallel processing capabilities. Virtual computer system processing may be constructed to implement one or more of the methods or functionalities as described herein, and a processor described herein may be used to support a virtual processing environment.

Figure 2:
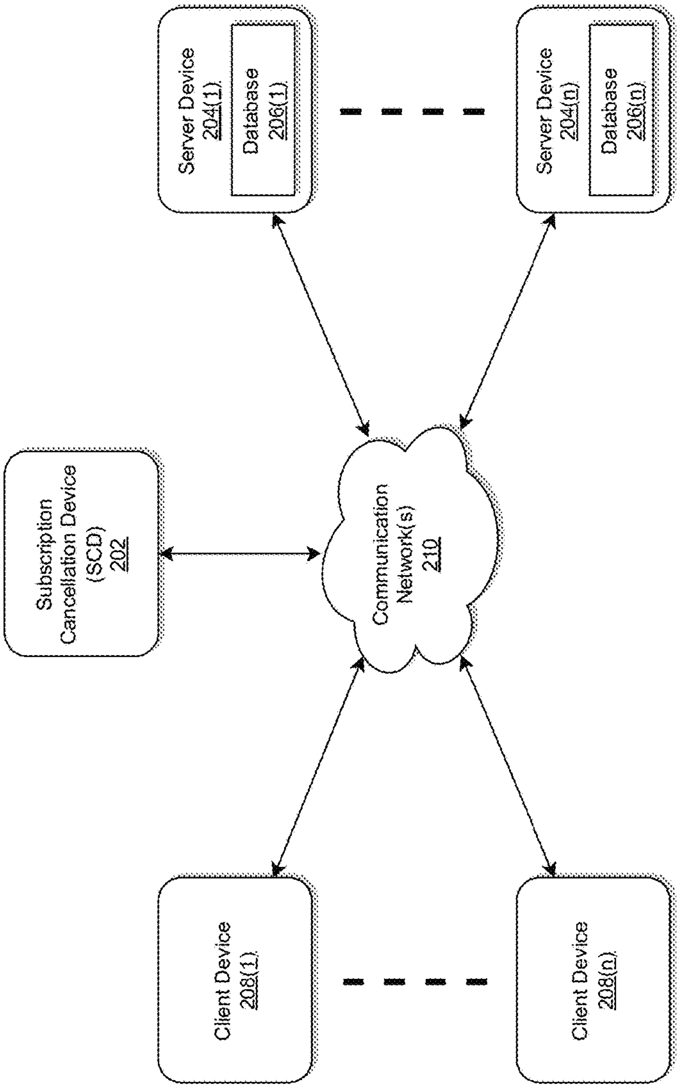
FIG. 2 illustrates a diagram of a network environment with a platform, cloud, and language agnostic subscription cancellation device in accordance with an embodiment.

Referring to FIG. 2, a schematic of a network environment 200 for implementing a platform, cloud, and language agnostic subscription cancellation device (SCD) of the instant disclosure is illustrated.

In some embodiments, the above-described problems associated with conventional tools may be overcome by implementing an SCD 202 as illustrated in FIG. 2 that may be configured for allowing a user to cancel subscriptions from the user's mobile device "settings" page in a consistent and seamless manner irrespective of how the subscription was signed up (i.e., via Appstore or via merchant site), but the disclosure is not limited thereto.

The SCD 202 may be the same or similar to the computer system 102 as described with respect to FIG. 1.

The SCD 202 may store one or more applications that may include executable instructions that, when executed by the SCD 202, cause the SCD 202 to perform actions, such as to transmit, receive, or otherwise process network messages, for example, and to perform other actions described and illustrated below with reference to the figures. The application(s) may be implemented as modules or components of other applications. Further, the application(s) may be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SCD 202 itself, may be located in virtual server(s) running in a cloud-based computing environment rather than being tied to one or more specific physical network computing devices. Also, the application(s) may be running in one or more virtual machines (VMs) executing on the SCD 202. Additionally, in one or more embodiments of this technology, virtual machine(s) running on the SCD 202 may be managed or supervised by a hypervisor.

In the network environment 200 of FIG. 2, the SCD 202 is coupled to a plurality of server devices 204(1)-204(*n*) that hosts a plurality of databases 206(1)-206(*n*), and also to a plurality of client devices 208(1)-208(*n*) via communication network(s) 210. A communication interface of the SCD 202, such as the network interface 114 of the computer system 102 of FIG. 1, operatively couples and communicates between the SCD 202, the server devices 204(1)-204(*n*), and/or the client devices 208(1)-208(*n*), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SCD 202, the server devices 204(1)-204(*n*), and/or the client devices 208(1)-208(*n*) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and may use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SCD 202 may be a standalone device or integrated with one or more other devices or apparatuses, such as one or more of the server devices 204(1)-204(*n*), for example. In one particular example, the SCD 202 may be hosted by one of the server devices 204(1)-204(*n*), and other arrangements are also possible. Moreover, one or more of the devices of the SCD 202 may be in the same or a different communication network including one or more public, private, or cloud networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204(*n*) may include, among other features, one or more processors, a memory, and a communication interface, which are coupled together by a bus or other communication link, although other numbers and/or types of network devices may be used. The server devices 204(1)-204(*n*) in this example may process requests received from the SCD 202 via the communication network(s) 210 according to the HTTP-based and/or JavaScript Object Notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) hosts the databases 206(1)-206(*n*) that are configured to store metadata sets, data quality rules, and newly generated data, but the disclosure is not limited thereto. For example, the database(s) 206(1)-206(*n*) may be a mainframe database, a log database that may produce programming for searching, monitoring, and analyzing machine-generated data via a web interface, etc., but the disclosure is not limited thereto. The database(s) 206(1)-206(*n*) may also include relational databases and NoSQL databases (key-value, column, document, graph, multi-model, etc.). Moreover, the SCD 202 may be configured to leverage any database protocol (i.e., Java Database Connectivity, Open Database Connectivity, etc.) and distributed file systems for reading/writing data (i.e., Hadoop Distributed File System, Amazon Simple Storage Service, etc.).

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a master/slave approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(*n*) or other client devices 208(1)-208(*n*).

In some embodiments, the client devices 208(1)-208(*n*) in this example may include any type of computing device that may facilitate the implementation of the SCD 202 that may efficiently provide a platform for implementing a platform, cloud, and language agnostic subscription cancellation module for allowing a user to cancel subscriptions from the user's mobile device "settings" page in a consistent and seamless manner irrespective of how the subscription was signed up (i.e., via Appstore or via merchant site), but the disclosure is not limited thereto.

The client devices 208(1)-208(*n*) may run interface applications, such as standard web browsers or standalone client applications, which may provide an interface to communicate with the SCD 202 via the communication network(s) 210 in order to communicate user requests. The client devices 208(1)-208(*n*) may further include, among other features, a display device, such as a display screen or touchscreen, and/or an input device, such as a keyboard, for example.

Although the exemplary network environment 200 with the SCD 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SCD 202, the server devices 204(1)-204(*n*), or the client devices 208(1)-208(*n*), for example, may be configured to operate as virtual instances on the same physical machine. For example, one or more of the SCD 202, the server devices 204(1)-204(*n*), or the client devices 208(1)-208(*n*) may operate on the same physical device rather than as separate devices communicating through communication network(s) 210. Additionally, there may be more or fewer SCDs 202, server devices 204(1)-204(*n*), or client devices 208(1)-208(*n*) than illustrated in FIG. 2. In some embodiments, the SCD 202 may be configured to send code at run-time to remote server devices 204(1)-204(*n*), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
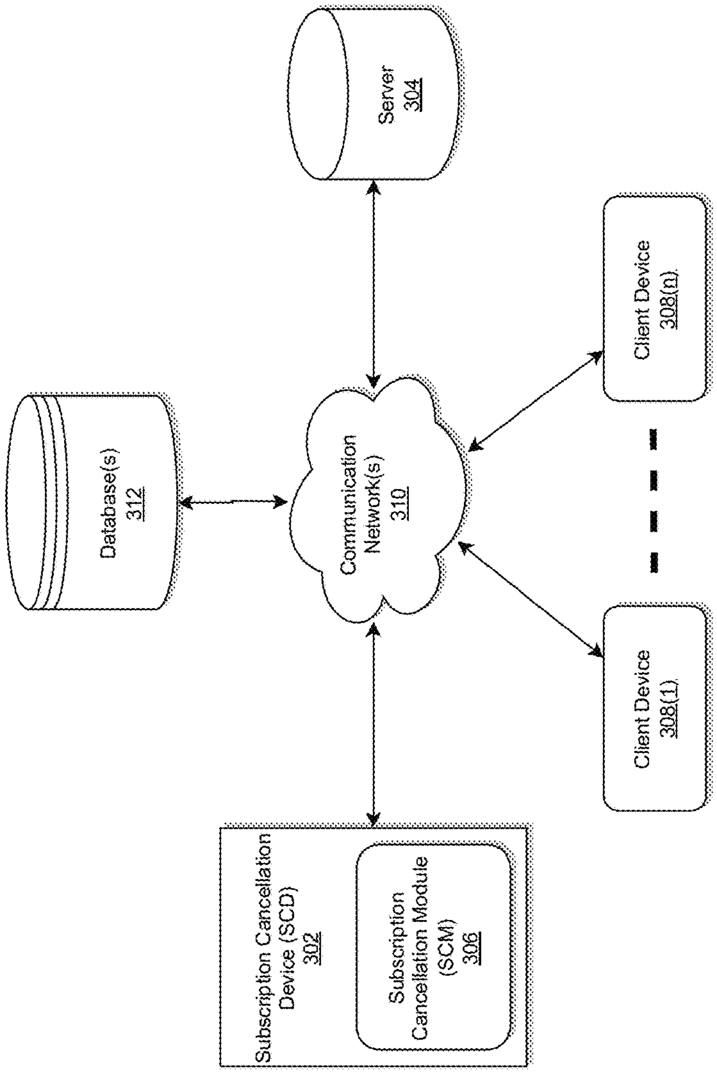
FIG. 3 illustrates a system diagram for implementing a platform, cloud, and language agnostic subscription cancellation device having a platform, cloud, and language agnostic subscription cancellation module in accordance with an embodiment.

FIG. 3 illustrates a system diagram for implementing an SCD having a platform, cloud, and language agnostic subscription cancellation module (SCM) in accordance with an embodiment.

As illustrated in FIG. 3, the system 300 may include an SCD 302 within which an SCM 306 is embedded, a server 304, a database(s) 312, a plurality of client devices 308(1) . . . 308(*n*), and a communication network 310.

In some embodiments, the SCD 302 including the SCM 306 may be connected to the server 304, and the database(s) 312 via the communication network 310. The SCD 302 may also be connected to the plurality of client devices 308(1) . . . 308(*n*) via the communication network 310, but the disclosure is not limited thereto.

According to embodiment, the SCD 302 is described and shown in FIG. 3 as including the SCM 306, although it may include other rules, policies, modules, databases, or applications, for example. In some embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) 312 may be a mainframe database, a log database that may produce programming for searching, monitoring, and analyzing machine-generated data via a web interface, etc., but the disclosure is not limited thereto. For example, the database(s) 312 may also include relational databases and NoSQL databases (key-value, column, document, graph, multi-model, etc.). Moreover, the SCM 306 may be configured to leverage any database protocol (i.e., Java Database Connectivity, Open Database Connectivity, etc.) and distributed file systems for reading/writing data (i.e., Hadoop Distributed File System, Amazon Simple Storage Service, etc.).

In some embodiments, the SCM 306 may be configured to receive real-time feed of data from the plurality of client devices 308(1) . . . 308(*n*), and the database(s) 312 via the communication network 310. In some embodiments, the SCM 306 may be configured to utilize stream processing systems as the real-time feed. For example, the real-time feed(s) may be a stream processing system, but the disclosure is not limited thereto.

As will be described below, the SCM 306 may be configured to: provide a database that stores a customer's card subscription payment details data associated with online subscriptions with one or more merchants; grant access to the customer's card subscription payment details data from the database to a mobile operating system embedded within a mobile device of the customer; call, in response to granting the access, a first application programming interface received from the mobile operating system to retrieve and display a list of merchants with active subscriptions tied to the customer's card along with a corresponding uniform resource locator link onto a graphical user interface within the customers' mobile device to cancel a corresponding active subscription; call, in response to granting the access, a second application programming interface received from the mobile operating system to allow cancellation of the corresponding active subscription; integrate the customer's mobile device to a third party subscription cancellation provider platform; receive, in response to integrating, an input via the graphical user interface to select a merchant associated with the corresponding active subscription the customer wants to cancel; and cancel, in response to receiving the input, the corresponding active subscription associated with the selected merchant utilizing the third party subscription cancellation provider platform, but the disclosure is not limited thereto.

The plurality of client devices 308(1) . . . 308(*n*) are illustrated as being in communication with the SCD 302. In this regard, the plurality of client devices 308(1) . . . 308(*n*) may be "clients" (e.g., customers) of the SCD 302 and are described herein as such. Nevertheless, it is to be known and understood that the plurality of client devices 308(1) . . . 308(*n*) need not necessarily be "clients" of the SCD 302, or any entity described in association therewith herein. Any additional or alternative relationship may exist between either or both of the plurality of client devices 308(1) . . . 308(*n*) and the SCD 302, or no relationship may exist.

The first client device 308(1) may be, for example, a smart phone. Of course, the first client device 308(1) may be any additional device described herein. The second client device 308(*n*) may be, for example, a personal computer (PC). Of course, the second client device 308(*n*) may also be any additional device described herein. In some embodiments, the server 304 may be the same or equivalent to the server device 204 as illustrated in FIG. 2.

The process may be executed via the communication network 310, which may comprise plural networks as described above. For example, in an embodiment, one or more of the plurality of client devices 308(1) . . . 308(*n*) may communicate with the SCD 302 via broadband or cellular communication. Of course, these embodiments are merely exemplary and are not limiting or exhaustive.

The computing device 301 may be the same or similar to any one of the client devices 208(1)-208(*n*) as described with respect to FIG. 2, including any features or combination of features described with respect thereto. The SCD 302 may be the same or similar to the SCD 202 as described with respect to FIG. 2, including any features or combination of features described with respect thereto.

Figure 4:
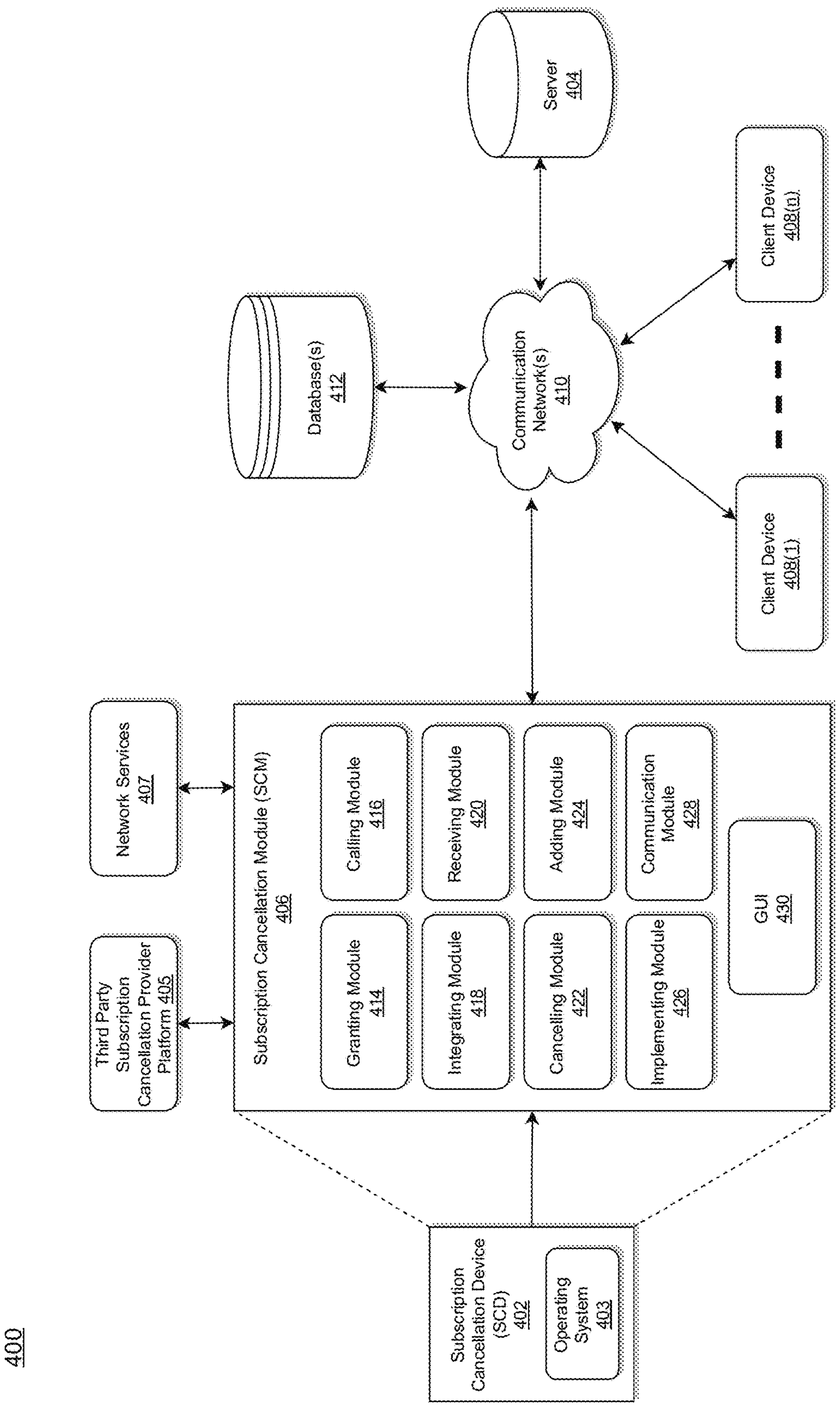
FIG. 4 illustrates a system diagram for implementing a platform, cloud, and language agnostic subscription cancellation module of FIG. 3 in accordance with an embodiment.

FIG. 4 illustrates a system diagram for implementing an SCM of FIG. 3 in accordance with an embodiment.

In some embodiments, the system 400 may include a platform, cloud, and language agnostic SCD 402 within which a platform, cloud, and language agnostic SCM 406 is embedded, a server 404, database(s) 412, a third party subscription cancellation provider platform 405, network services 407, and a communication network 410.

In some embodiments, the SCD 402 including the SCM 406 may be connected to the server 404, the third party subscription cancellation provider platform 405 or alternatively makes API call to the network services 407 for subscription cancellation, and the database(s) 412 via the communication network 410. The SCD 402 may also be connected to the plurality of client devices 408(1)-408(*n*) via the communication network 410, but the disclosure is not limited thereto. The SCM 406, the server 404, the plurality of client devices 408(1)-408(n), the database(s) 412, the communication network 410 as illustrated in FIG. 4 may be the same or similar to the SCM 306, the server 304, the plurality of client devices 308(1)-308(n), the database(s) 312, the communication network 310, respectively, as illustrated in FIG. 3.

In some embodiments, as illustrated in FIG. 4, the SCM 406 may include a granting module 414, a calling module 416, an integrating module 418, a receiving module 420, a cancelling module 422, an adding module 424, an implementing module 426, a communication module 428, and a GUI 430. In some embodiments, interactions and data exchange among these modules included in the SCM 406 provide the advantageous effects of the disclosed invention. Functionalities of each module of FIG. 4 may be described in detail below with reference to FIGS. 4-7.

In some embodiments, each of the granting module 414, the calling module 416, the integrating module 418, the receiving module 420, the cancelling module 422, the adding module 424, the implementing module 426, and the communication module 428 of the SCM 406 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

In some embodiments, each of the granting module 414, the calling module 416, the integrating module 418, the receiving module 420, the cancelling module 422, the adding module 424, the implementing module 426, and the communication module 428 of the SCM 406 may be implemented by microprocessors or similar, and may be programmed using software (e.g., microcode) to perform various functions discussed herein and may optionally be driven by firmware and/or software.

Alternatively, in some embodiments, each of the granting module 414, the calling module 416, the integrating module 418, the receiving module 420, the cancelling module 422, the adding module 424, the implementing module 426, and the communication module 428 of the SCM 406 may be implemented by dedicated hardware, or as a combination of dedicated hardware to perform some functions and a processor (e.g., one or more programmed microprocessors and associated circuitry) to perform other functions.

In some embodiments, each of the granting module 414, the calling module 416, the integrating module 418, the receiving module 420, the cancelling module 422, the adding module 424, the implementing module 426, and the communication module 428 of the SCM 406 may be called via corresponding API.

Figure 5:
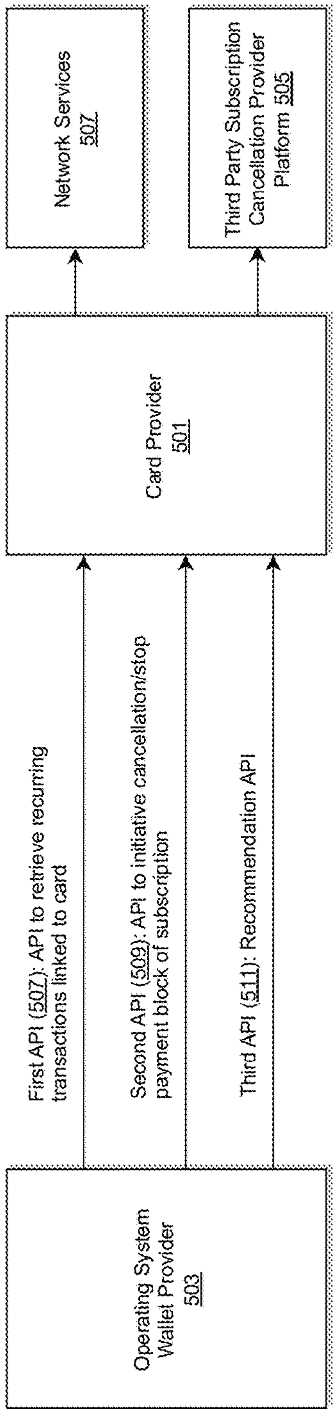
FIG. 5 illustrates a process flow architecture implemented by the platform, cloud, and language agnostic subscription cancellation module of FIG. 4 for subscription cancellation in accordance with an embodiment.

FIG. 5 illustrates a process flow architecture 500 implemented by the platform, cloud, and language agnostic SCM 406 of FIG. 4 for subscription cancellation in accordance with an embodiment. In the exemplary process flow architecture 500 as illustrated in FIG. 5, operating system wallet provider 503 is in communication with a card provider 501 and the card provider is integrated with a third party subscription cancellation provider platform 505 for subscription cancellation as disclosed herein, but the disclosure is not limited thereto. For example, in some embodiments, the SCM 406 may be implemented in such a manner to put the card provider 501 in the middle rather than the customer's mobile device integrating directly with the third party subscription cancellation provider platform 505. Furthermore, in some embodiments, the card provider 501 may be configured to decide if it wants to call the third party subscription cancellation provider platform 505 or network APIs to connect to the network services 507 for subscription cancellation or block the transaction internally based on the merchant and use case.

In some embodiments, the operating system wallet provider 503 may include IOS or Android wallet provider, but the disclosure is not limited thereto. In some embodiments, the third party subscription cancellation provider platform 505 may include a platform provided by Visa or Mastercard network or any Fin Tech partners, but the disclosure is not limited thereto. Subscription cancellation with the card provider 501 may be performed via variety of ways, for example, kill token, Visa API, POS rule, or various fintech partners, but the disclosure is not limited thereto.

A subscription cancellation process is described below with reference to FIGS. 4 and 5.

The process may be executed via the communication module 428 and the communication network 410, which may comprise plural networks as described above. For example, in an embodiment, the various components of the SCM 406 may communicate with the server 404, the third party subscription cancellation provider platform 405, 505, and the database(s) 412 via the communication module 438 and the communication network 410. Of course, these embodiments are merely exemplary and are not limiting or exhaustive.

In some embodiments, the database(s) 412 may store a customer's card subscription payment details data associated with online subscriptions with one or more merchants. The granting module 414 may be configured to grant access to the customer's card subscription payment details data from the database(s) 412 to a mobile operating system 403 embedded within a mobile device (i.e., one of the SCD 402 or client device 408(1-408(n)) of the customer.

In some embodiments, the calling module 416 may be configured to call, in response to granting the access, a first application programming interface (API) (i.e., first API 507 as illustrated in FIG. 5) received from the mobile operating system (i.e., operating system wallet provider 503) to retrieve and display a list of merchants with active subscriptions tied to the customer's card onto the GUI 430 within the customers' mobile device to cancel a corresponding active subscription. As illustrated in FIG. 5, the first API 507 is called to retrieve recurring transactions linked to the customer's card.

In some embodiments, the calling module 416 may be further configured to call, in response to granting the access, a second API (i.e., API 509 as illustrated in FIG. 5) received from the mobile operating system (i.e., operating system wallet provider 503) to allow cancellation of the corresponding active subscription. As illustrated in FIG. 5, the second API 509 is called to initiate cancellation/stop payment block of subscription.

In some embodiments, the integrating module 418 may be configured to integrate the customer's mobile device to the third party subscription cancellation provider platform 405, 505. The receiving module 420 may be configured to receive, in response to integrating, an input via the GUI 430 to select a merchant associated with the corresponding active subscription the customer wants to cancel. The cancelling module 422 may be configured to cancel, in response to receiving the input, the corresponding active subscription associated with the selected merchant utilizing the third party subscription cancellation provider platform 405, 505.

In some embodiments, the customer may sign up for the online subscription directly from a merchant website associated with the merchant without going through an Appstore.

In some embodiments, in granting the access to the customer's card subscription payment details data, the adding module 424 may be further configured to add the customer's card to a mobile wallet of the operating system.

In some embodiments, the receiving module 420 may be further configured to receive an acknowledgement message via the mobile device that the customer's card may be successfully added to the mobile wallet with an opt-in option that allows sharing the customer's subscription details data tied to the customer's card with the operating system; and receive an input that the customer selected the opt-in option.

In some embodiments, the GUI 430 may be configured to display, in response to receiving the input to select the merchant whose subscription the customer wants to cancel, a cancelled workflow.

In some embodiments, the calling module 416 may be further configured to call, in response to the cancelled workflow, a third API (i.e., third 511 as illustrated in FIG. 5) received from the mobile operating system (i.e., the operating system wallet provider 503 as illustrated in FIG. 5) to recommend that the customer subscribe to other subscriptions provided by other merchants based on analyzing deals data related to the customer card and customer transaction habits data and demographics data retrieved from the database. As exemplary use case may include the following: a customer just cancelled Netflix subscription and the third API 511 (i.e., a recommendation API) recommends that the customer signs up for Hulu or Disney plus based on deals related to the customer cards and customer transaction habits and demographics.

In some embodiments, when cancellation of subscription fails due to unable to reach the merchant via the uniform resource locator link, the implementing module 426 may be configured to implement a rule or token to block future payments from the customer card for the merchant.

Figure 6A:
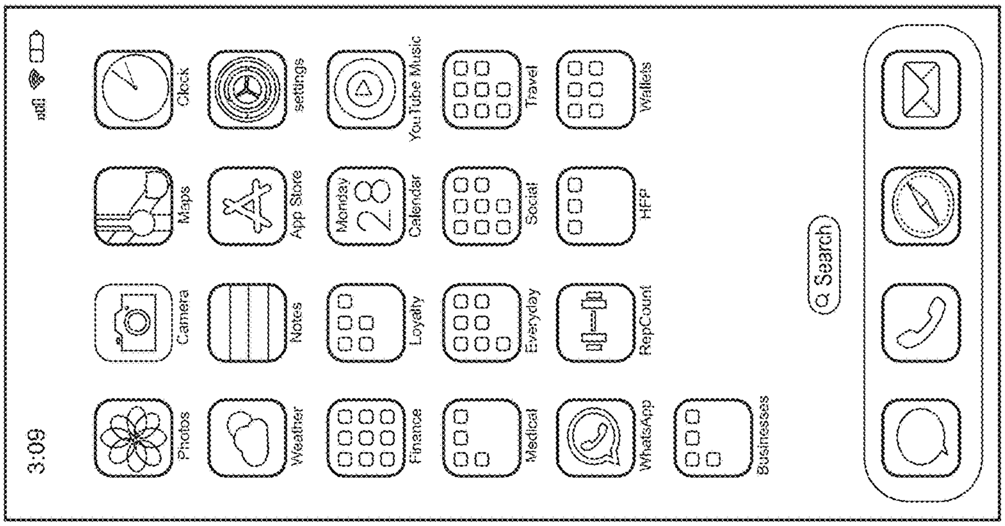
FIG. 6A illustrates a graphical user interface displaying home page of a mobile device in accordance with an embodiment.

FIG. 6A illustrates a graphical user interface displaying home page 600*a* of a mobile device in accordance with an embodiment. As illustrated in FIG., a user is on iOS device home page and goes to "settings," but the disclosure is not limited thereto.

Figure 6B:
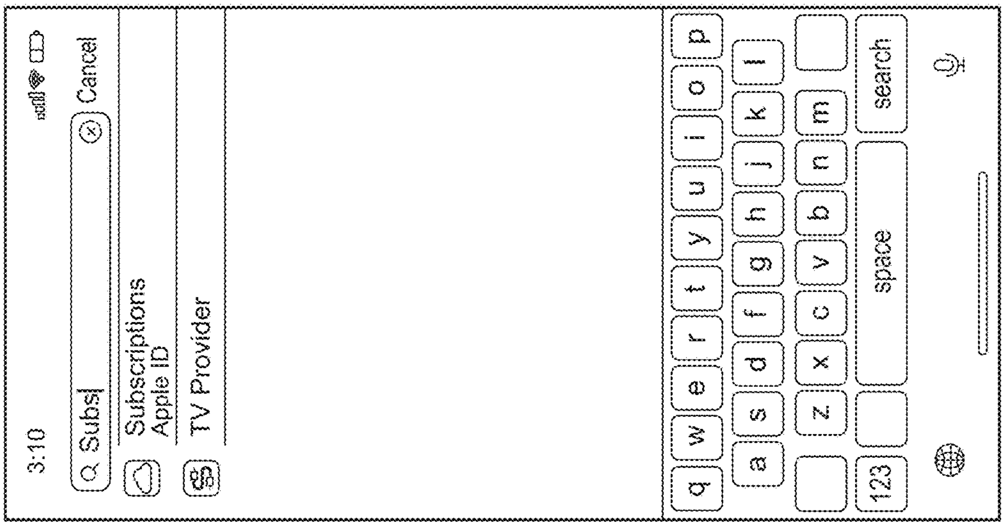
FIG. 6B illustrates another graphical user interface displaying a setting page where a user may navigate to subscription page in accordance with an embodiment.

FIG. 6B illustrates another graphical user interface displaying a setting page 600*b* where a user may navigate to subscription page in accordance with an embodiment. As illustrated in FIG. 6B, the user is on settings page and navigates to subscription page.

Figure 6C:
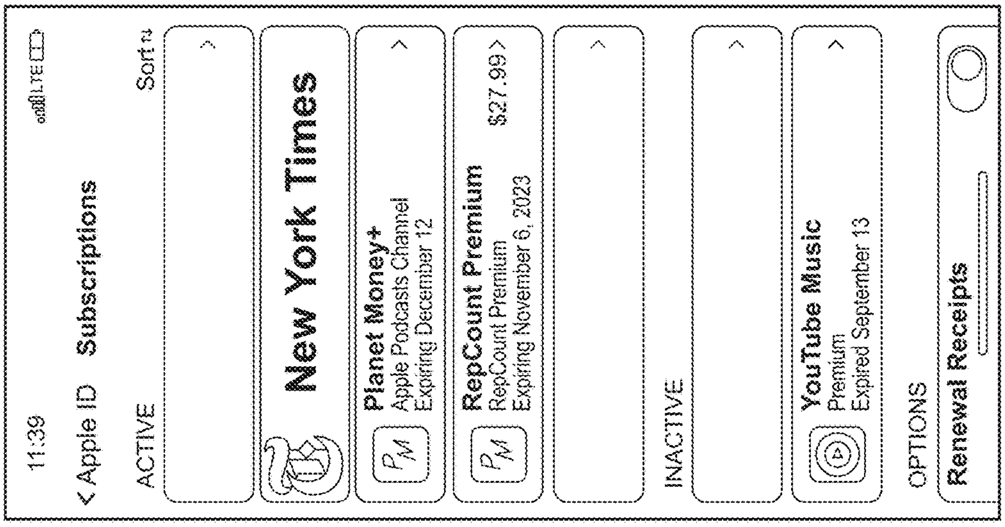
FIG. 6C illustrates another graphical user interface displaying all active subscriptions in accordance with an embodiment.

FIG. 6C illustrates another graphical user interface displaying a page 600*c* for all active subscriptions in accordance with an embodiment. As illustrated in FIG. 6C, user views all active subscriptions regardless of how the user signed up (i.e., subscriptions signed up via Appstroe and subscriptions signed up via merchant website other than Appstore) including "Newyork times." The user tabs on Newyork times tile.

Figure 6D:
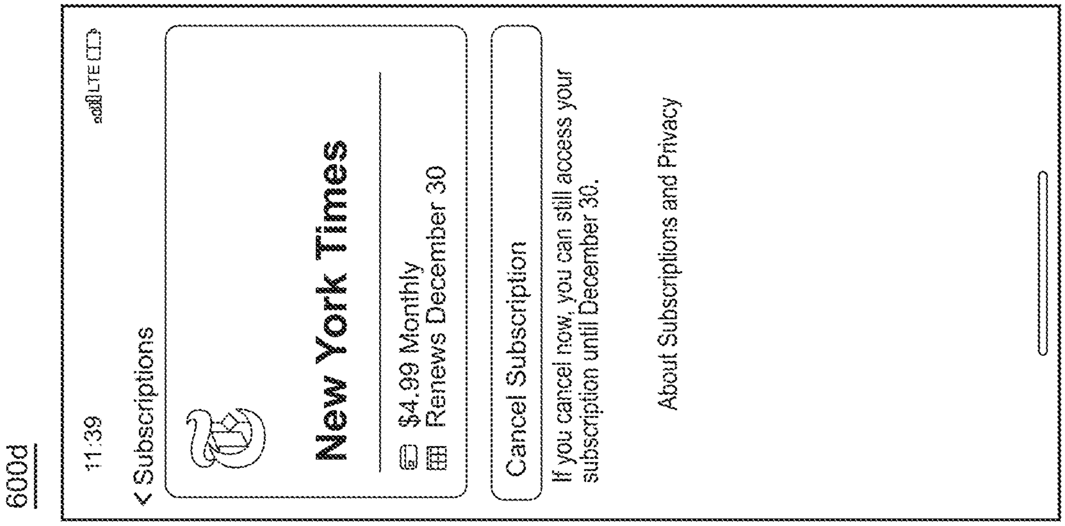
FIG. 6D illustrates another graphical user interface displaying a cancel subscription link in accordance with an embodiment.

FIG. 6D illustrates another graphical user interface displaying a page 600*d* illustrating, among others, a cancel subscription link in accordance with an embodiment. As illustrated in FIG. 6D, the user tabs on "cancel subscription link."

Figure 6E:
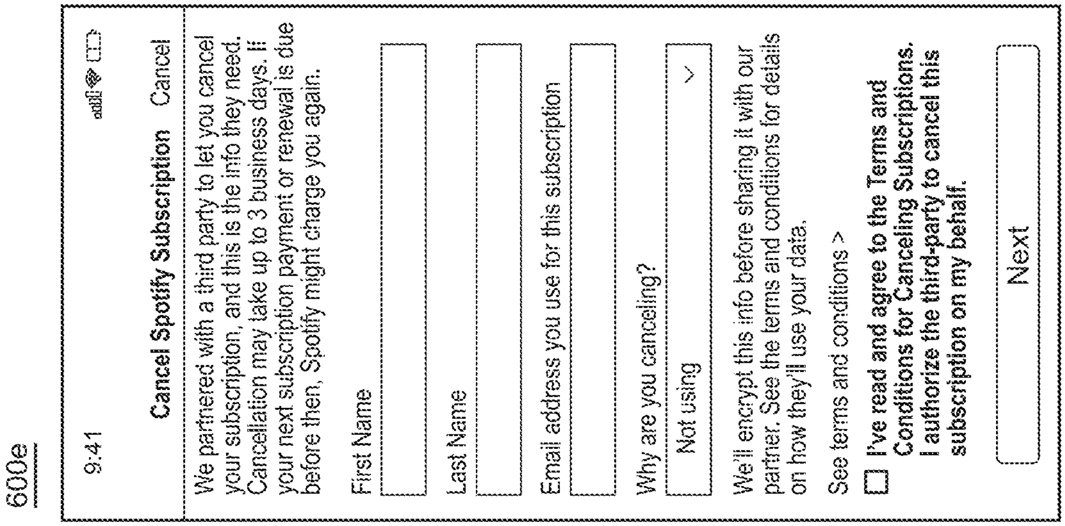
FIG. 6E illustrates another graphical user interface displaying a subscription cancellation workflow in accordance with an embodiment.

FIG. 6E illustrates another graphical user interface displaying a subscription cancellation workflow 600*e* in accordance with an embodiment. As illustrated in FIG. 6E, the user views subscription cancellation workflow within the iOS and enters information required to cancel Newyork times subscription, but the disclosure is not limited thereto. The user then enters the required information, accepts terms and conditions, and tabs Next.

Figure 6F:
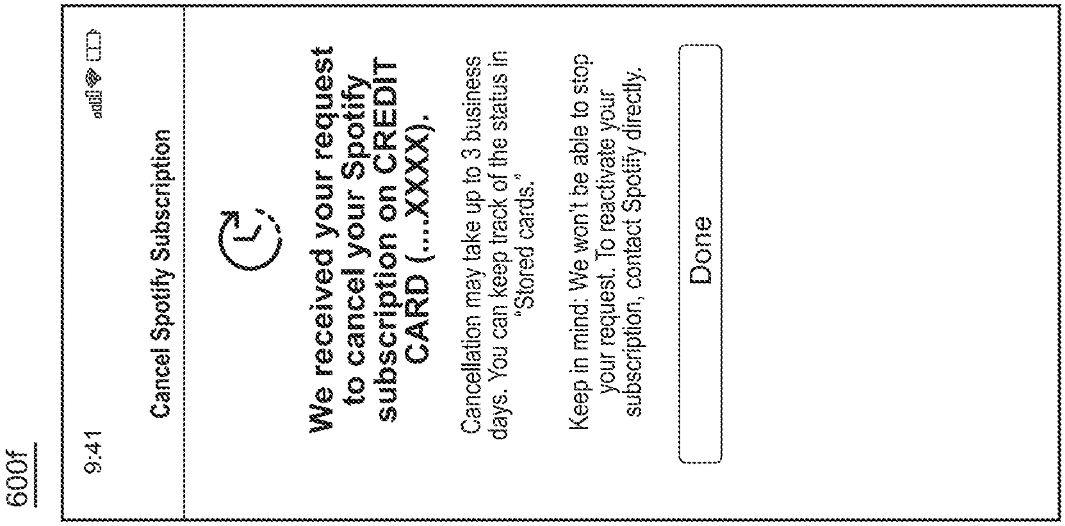
FIG. 6F illustrates another graphical user interface displaying a notification regarding submission of subscription cancellation in accordance with an embodiment.

FIG. 6F illustrates another graphical user interface displaying a notification 600*f* regarding submission of subscription cancellation in accordance with an embodiment. As illustrated in FIG. 6F, the user views submit cancellation request notification and may enter "Done."

Figure 7B:
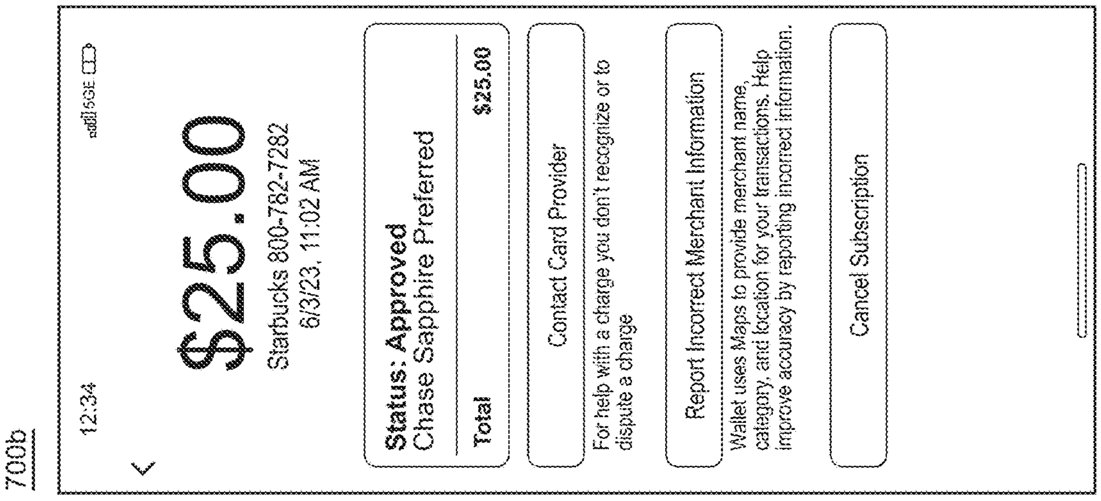
FIG. 7B illustrates another graphical user interface displaying a wallet page where a where a specific transaction is shown in accordance with an embodiment.
Figure 7A:
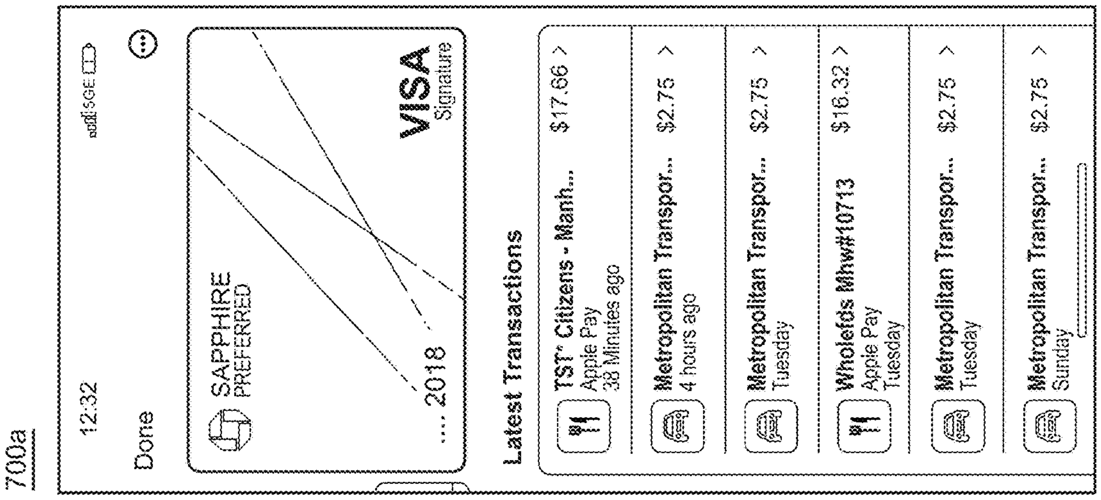
FIG. 7A illustrates a graphical user interface displaying wallet page of a mobile device in accordance with an embodiment.

FIG. 7A illustrates a graphical user interface displaying wallet page 700*a* of a mobile device utilized by in accordance with an embodiment. As illustrated in FIG. 7A, the wallet page is displaying latest transactions by the card of the user, but the disclosure is not limited thereto.

FIG. 7B illustrates another graphical user interface displaying a wallet page 700*b* where a specific transaction is shown in accordance with an embodiment. As illustrated in FIG. 7B, in this page, the user may view approved transactions as well as has option to contact the card provider, report incorrect merchant information, or cancel subscription.

In some embodiments, the process as illustrated in FIGS. 6A through 7B may be implemented via both web-based solution (i.e., desktop web experience) as well as mobile-based solution (i.e., mobile phones, iPads, tablets, etc.), depending on user's preference, but the disclosure is not limited thereto.

In some embodiments, the GUI 430 may display where a customer's card may be stored, and the user may select that entry to initiate cancellation of any subscriptions under that card (or however many cards) (i.e., based on obtaining data corresponding to card transactions with respect to subscriptions; recurring charges, transactions level data, card on file transaction data, whether Card Verification Value (CVV) is transmitted to the system or manually entered, etc.) utilizing the processes disclosed above with respect to FIGS. 4-7B. For example, the GUI 430 may display current subscriptions under that card, and connect to a third party provider to initiate the cancellation process. The third party has a list of subscriptions under that card (or however many cards). This initiation may include prompting the user to fill out a form and receive a notification from the third party that the cancellation process may take a few days (i.e., three days or any other preconfigured days) to complete cancellation of subscriptions that utilize the underlying card. The third party provider as well as the SCM 406 may periodically provide status updates of such cancellation process. The communication module 428 may be utilized to send an electronic message (i.e., email, text, or any other form of electronic communications) to the user (i.e., customer) about the status updates.

In some embodiments, the SCM 406 may be configured to allow to swap a card with current card for a subscription, or pause subscriptions for a certain preconfigured time period instead of cancelling subscriptions.

In some embodiments, instead of finding out where a particular card is utilized for subscriptions, the SCM 406 may be configured to allow the customer to find out where a particular card is used (i.e., stored cards) other than subscriptions for managing expense or other financial management scenarios. For example, the SCM 406 may be integrated with other third party platforms (i.e., Visa, Mastercard, etc.) to allow a customer to stop using the card (stop payment solution) for a particular merchant via integrating corresponding APIs if that particular merchant does not allow subscription cancellation. Thus, these APIs may be utilized by the SCM 406 broadly across line of business ecosystems.

Figure 8:
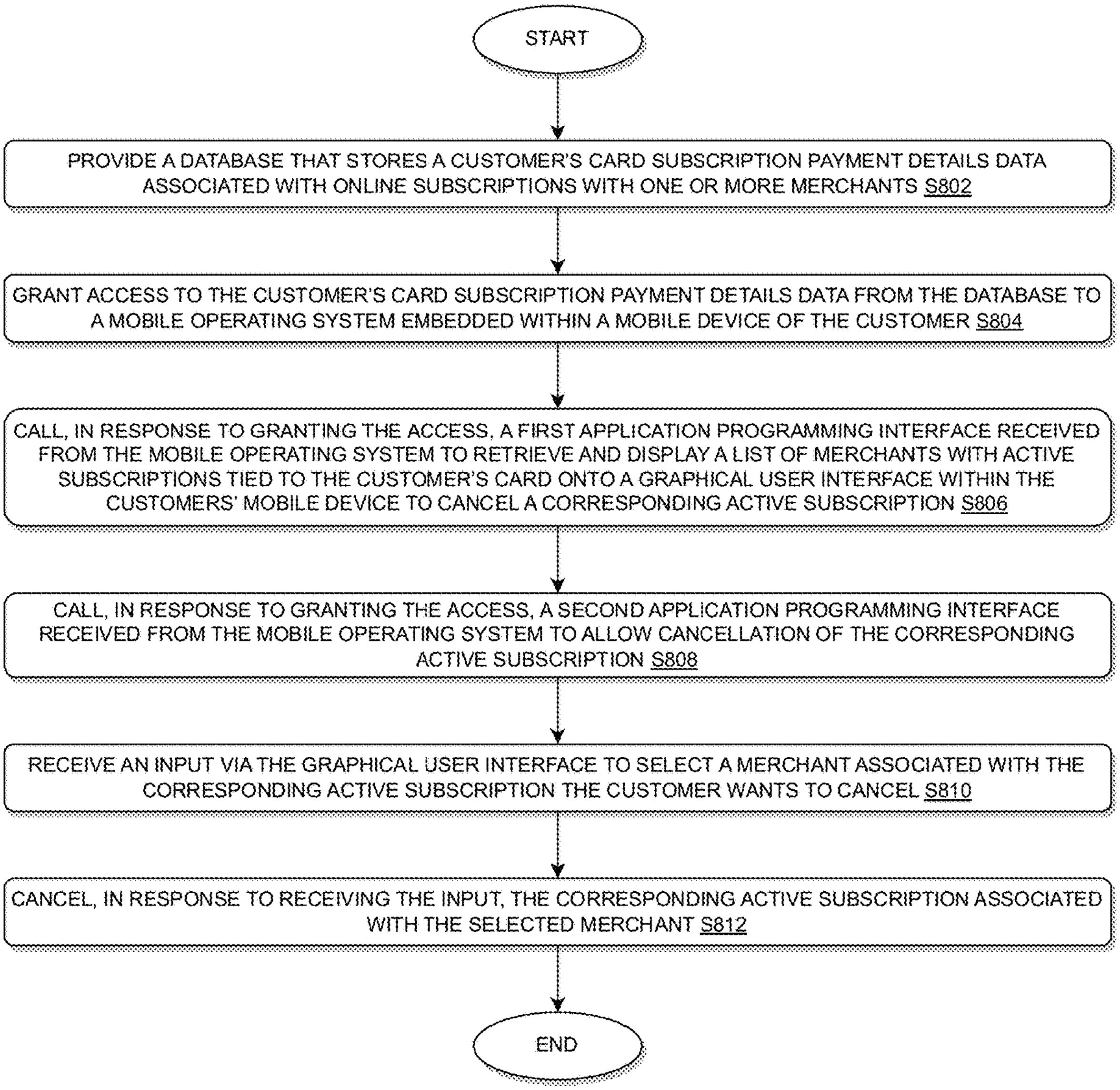
FIG. 8 illustrates a flow chart of a process implemented by the platform, cloud, and language agnostic subscription cancellation module of FIG. 4 configured to allow a user to cancel subscriptions in a consistent and seamless manner irrespective of how the subscription was signed up in accordance with an embodiment.

FIG. 8 illustrates a flow chart of a process 800 implemented by the SCM 406 of FIG. 4 configured to allow a user to cancel subscriptions in a consistent and seamless manner irrespective of how the subscription was signed up in accordance with an embodiment. It will be appreciated that the illustrated process 800 and associated steps may be performed in a different order, with illustrated steps omitted, with additional steps added, or with a combination of reordered, combined, omitted, or additional steps.

As illustrated in FIG. 8, at step S802, the process 800 may include providing a database that stores a customer's card subscription payment details data associated with online subscriptions with one or more merchants.

At step S804, the process 800 may include granting access to the customer's card subscription payment details data from the database to a mobile operating system embedded within a mobile device of the customer.

At step S806, the process 800 may include calling, in response to granting the access, a first application programming interface received from the mobile operating system to retrieve and display a list of merchants with active subscriptions tied to the customer's card onto a graphical user interface within the customers' mobile device to cancel a corresponding active subscription.

At step S808, the process 800 may include calling, in response to granting the access, a second application programming interface received from the mobile operating system to allow cancellation of the corresponding active subscription.

At step S810, the process 800 may include receiving, in response to integrating, an input via the graphical user interface to select a merchant associated with the corresponding active subscription the customer wants to cancel.

At step S812, the process 800 may include, cancelling, in response to receiving the input, the corresponding active subscription associated with the selected merchant.

In some embodiments, in the process 800, the customer may sign up for the online subscription directly from a merchant website associated with the merchant without going through an Appstore.

In some embodiments, in granting the access to the customer's card subscription payment details data, the process 800 may further include: adding the customer's card to a mobile wallet of the operating system.

In some embodiments, the process 800 may further include: receiving an acknowledgement message via the mobile device that the customer's card may be successfully added to the mobile wallet with an opt-in option that allows sharing the customer's subscription details data tied to the customer's card with the operating system; and receiving an input that the customer selected the opt-in option.

In some embodiments, the process 800 may further include: displaying on to the graphical user interface, in response to receiving the input to select the merchant whose subscription the customer wants to cancel, a cancelled workflow.

In some embodiments, the process 800 may further include: calling, in response to the cancelled workflow, a third application programming interface received from the mobile operating system to recommend that the customer subscribe to other subscriptions provided by other merchants based on analyzing deals data related to the customer card and customer transaction habits data and demographics data retrieved from the database.

In some embodiments, the process 800 may further include: integrating the customer's mobile device to a third party subscription cancellation provider platform; receiving, in response to integrating, an input via the graphical user interface to select the merchant associated with the corresponding active subscription the customer wants to cancel; and cancelling, in response to receiving the input, the corresponding active subscription associated with the selected merchant utilizing the third party subscription cancellation provider platform, but the disclosure is not limited thereto.

For example, in some embodiments, the process 800 may further include: implementing the subscription cancellation module in such a manner to put the card provider in the middle rather than the customer's mobile device integrating directly with the third party subscription cancellation provider platform. Furthermore, in some embodiments, in the method, the card provider may be configured to decide if it wants to call the third party subscription cancellation provider platform or network APIs to connect to the network services for subscription cancellation or block the transaction internally based on the merchant and use case.

In some embodiments, when cancellation of subscription fails due to unable to reach the merchant via the uniform resource locator link, the process 800 may further include: implementing a rule or token to block future payments from the customer card for the merchant.

In some embodiments, the SCD 402 may include a memory (e.g., a memory 106 as illustrated in FIG. 1) which may be a non-transitory computer readable medium that may be configured to store instructions for implementing an SCM 406 for cancelling subscriptions in a consistent and seamless manner irrespective of how the subscription was signed up as disclosed herein. The SCD 402 may also include a medium reader (e.g., a medium reader 112 as illustrated in FIG. 1) which may be configured to read any one or more sets of instructions, e.g., software, from any of the memories described herein. The instructions, when executed by a processor embedded within the SCM 406 or within the SCD 402, may be used to perform one or more of the methods and processes as described herein. In a particular embodiment, the instructions may reside completely, or at least partially, within the memory 106, the medium reader 112, and/or the processor 104 (see FIG. 1) during execution by the SCD 402.

In some embodiments, the instructions, when executed, may cause a processor embedded within the SCM 406 or the SCD 402 to perform the following: providing a database that stores a customer's card subscription payment details data associated with online subscriptions with one or more merchants; granting access to the customer's card subscription payment details data from the database to a mobile operating system embedded within a mobile device of the customer; calling, in response to granting the access, a first application programming interface received from the mobile operating system to retrieve and display a list of merchants with active subscriptions tied to the customer's card onto a graphical user interface within the customers' mobile device to cancel a corresponding active subscription; calling, in response to granting the access, a second application programming interface received from the mobile operating system to allow cancellation of the corresponding active subscription; receiving an input via the graphical user interface to select a merchant associated with the corresponding active subscription the customer wants to cancel; and cancelling, in response to receiving the input, the corresponding active subscription associated with the selected merchant, but the disclosure is not limited thereto. In some embodiments, the processor may be the same or similar to the processor 104 as illustrated in FIG. 1 or the processor embedded within SCD 202, SCD 302, SCD 402, and SCM 406.

In some embodiments, in granting the access to the customer's card subscription payment details data, the instructions, when executed, may cause the processor 104 to further perform the following: adding the customer's card to a mobile wallet of the operating system.

In some embodiments, the instructions, when executed, may cause the processor 104 to further perform the following: receiving an acknowledgement message via the mobile device that the customer's card may be successfully added to the mobile wallet with an opt-in option that allows sharing the customer's subscription details data tied to the customer's card with the operating system; and receiving an input that the customer selected the opt-in option.

In some embodiments, the instructions, when executed, may cause the processor 104 to further perform the following: displaying on to the graphical user interface, in response to receiving the input to select the merchant whose subscription the customer wants to cancel, a cancelled workflow.

In some embodiments, the instructions, when executed, may cause the processor 104 to further perform the following: calling, in response to the cancelled workflow, a third application programming interface received from the mobile operating system to recommend that the customer subscribe to other subscriptions provided by other merchants based on analyzing deals data related to the customer card and customer transaction habits data and demographics data retrieved from the database.

In some embodiments, the instructions, when executed, may cause the processor 104 to further perform the following: integrating the customer's mobile device to a third party subscription cancellation provider platform; receiving, in response to integrating, an input via the graphical user interface to select the merchant associated with the corresponding active subscription the customer wants to cancel; and cancelling, in response to receiving the input, the corresponding active subscription associated with the selected merchant utilizing the third party subscription cancellation provider platform, but the disclosure is not limited thereto.

For example, in some embodiments, the instructions, when executed, may cause the processor 104 to further perform the following: implementing the subscription cancellation module in such a manner to put the card provider in the middle rather than the customer's mobile device integrating directly with the third party subscription cancellation provider platform. Furthermore, in some embodiments, the processor 104 may cause the card provider to decide if it wants to call the third party subscription cancellation provider platform or network APIs to connect to the network services for subscription cancellation or block the transaction internally based on the merchant and use case.

In some embodiments, when cancellation of subscription fails due to unable to reach the merchant via the uniform resource locator link, the instructions, when executed, may cause the processor 104 to further perform the following: implementing a rule or token to block future payments from the customer card for the merchant.

In some embodiments as disclosed above in FIGS. 1-8, technical improvements effected by the instant disclosure may include a platform for implementing a platform, cloud, and language agnostic subscription cancellation module allowing a user to cancel subscriptions from the user's mobile device "settings" page in a consistent and seamless manner irrespective of how the subscription was signed up (i.e., via Appstore or via merchant site), but the disclosure is not limited thereto. This subscription cancellation module implements an improved graphical user interface as disclosed herein.

Although the invention has been described with reference to several embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, may be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for cancelling online subscription by utilizing one or more processors along with allocated memory, the method comprising:

providing a database that stores a customer's card subscription payment details data associated with online subscriptions with one or more merchants;

granting access to the customer's card subscription payment details data from the database to a mobile operating system embedded within a mobile device of the customer;

executing, by the one or more processors, a platform-, language-, database-, and cloud-agnostic subscription cancellation module configured to: orchestrate subscription cancellation workflows, and process the configuration data defined in one or more structured or semi-structured formats including JSON, XML, or YAML to enable modification of cancellation logic;

integrating the customer's mobile device to a third party subscription cancellation provider platform via the platform-, language-, and cloud-agnostic subscription cancellation module;

calling, in response to granting the access, a first application programming interface received from the mobile operating system to retrieve and display a list of merchants with active subscriptions tied to the customer's card onto a graphical user interface within the customers' mobile device to cancel a corresponding active subscription;

calling, in response to granting the access, a second application programming interface received from the mobile operating system to allow cancellation of the corresponding active subscription;

receiving, in response to integrating, an input via the graphical user interface to select a merchant associated with the corresponding active subscription the customer wants to cancel; and cancelling, in response to receiving the input, the corresponding active subscription associated with the selected merchant by transmitting, via the second application programming interface, a cancellation request to the third party subscription cancellation provider platform over a network, wherein the second application programming interface is configured to receive a response from the third party subscription cancellation provider platform, and wherein a communication failure, timeout, or unsuccessful response associated with the second application programming interface indicates an inability to reach the merchant, and wherein, in response thereto, the platform-, language-, and cloud-agnostic subscription cancellation module identifies a token corresponding to the customer card and the selected merchant and transmits, via a network interface, a control message to a token service provider to modify a lifecycle state of the token or associate the token with a merchant-specific restriction that prevents authorization of subsequent transactions initiated by the merchant, such that future authorization requests involving the token are automatically declined, thereby blocking future payments from the customer card for the merchant.

2. The method according to claim 1, wherein the customer signed up for the online subscription directly from a merchant website associated with the merchant without going through an Appstore.

3. The method according to claim 2, in granting the access to the customer's card subscription payment details data, the method further comprising:

adding the customer's card to a mobile wallet of the operating system.

4. The method according to claim 3, further comprising:

receiving an acknowledgement message via the mobile device that the customer's card may be successfully added to the mobile wallet with an opt-in option that allows sharing the customer's subscription details data tied to the customer's card with the operating system; and receiving an input that the customer selected the opt-in option.

5. The method according to claim 1, further comprising: displaying on to the graphical user interface, in response to receiving the input to select the merchant whose subscription the customer wants to cancel, a cancelled workflow.

6. The method according to claim 5, further comprising: calling, in response to the cancelled workflow, a third application programming interface received from the mobile operating system to recommend that the customer subscribe to other subscriptions provided by other merchants based on analyzing deals data related to the customer card and customer transaction habits data and demographics data retrieved from the database.

7. A system for cancelling online subscription, the system comprising:

a processor; and a memory operatively connected to the processor via a communication interface, the memory storing computer readable instructions, when executed, causes the processor to:

provide a database that stores a customer's card subscription payment details data associated with online subscriptions with one or more merchants;

grant access to the customer's card subscription payment details data from the database to a mobile operating system embedded within a mobile device of the customer;

execute a platform-, language-, database-, and cloud-agnostic subscription cancellation module configured to: orchestrate subscription cancellation workflows, and process the configuration data defined in one or more structured or semi-structured formats including JSON, XML, or YAML to enable modification of cancellation logic;

integrate the customer's mobile device to a third party subscription cancellation provider platform via the platform-, language-, and cloud-agnostic subscription cancellation module;

call, in response to granting the access, a first application programming interface received from the mobile operating system to retrieve and display a list of merchants with active subscriptions tied to the customer's card onto a graphical user interface within the customers' mobile device to cancel a corresponding active subscription;

call, in response to granting the access, a second application programming interface received from the mobile operating system to allow cancellation of the corresponding active subscription;

receive, in response to integrating, an input via the graphical user interface to select a merchant associated with the corresponding active subscription the customer wants to cancel; and cancel, in response to receiving the input, the corresponding active subscription associated with the selected merchant by transmitting, via the second application programming interface, a cancellation request to the third party subscription cancellation provider platform over a network, wherein the second application programming interface is configured to receive a response from the third party subscription cancellation provider platform, and wherein a communication failure, timeout, or unsuccessful response associated with the second application programming interface indicates an inability to reach the merchant, and wherein, in response thereto, the platform-, language-, and cloud-agnostic subscription cancellation module identifies a token corresponding to the customer card and the selected merchant and transmits, via a network interface, a control message to a token service provider to modify a lifecycle state of the token or associate the token with a merchant-specific restriction that prevents authorization of subsequent transactions initiated by the merchant, such that future authorization requests involving the token are automatically declined, thereby blocking future payments from the customer card for the merchant.

8. The system according to claim 7, wherein the customer signed up for the online subscription directly from a merchant website associated with the merchant without going through an Appstore.

9. The system according to claim 8, in granting the access to the customer's card subscription payment details data, the processor is further configured to:

add the customer's card to a mobile wallet of the operating system.

10. The system according to claim 9, wherein the processor is further configured to:

receive an acknowledgement message via the mobile device that the customer's card may be successfully added to the mobile wallet with an opt-in option that allows sharing the customer's subscription details data tied to the customer's card with the operating system; and receive an input that the customer selected the opt-in option.

11. The system according to claim 7, wherein the processor is further configured to:

display on to the graphical user interface, in response to receiving the input to select the merchant whose subscription the customer wants to cancel, a cancelled workflow.

12. The system according to claim 11, wherein the processor is further configured to:

call, in response to the cancelled workflow, a third application programming interface received from the mobile operating system to recommend that the customer subscribe to other subscriptions provided by other merchants based on analyzing deals data related to the customer card and customer transaction habits data and demographics data retrieved from the database.

13. A non-transitory computer readable medium configured to store instructions for cancelling online subscription, wherein, when executed, the instructions cause a processor to perform the following:

providing a database that stores a customer's card subscription payment details data associated with online subscriptions with one or more merchants;

granting access to the customer's card subscription payment details data from the database to a mobile operating system embedded within a mobile device of the customer;

executing a platform-, language-, database-, and cloud-agnostic subscription cancellation module configured to: orchestrate subscription cancellation workflows, and process the configuration data defined in one or more structured or semi-structured formats including JSON, XML, or YAML to enable modification of cancellation logic;

integrating the customer's mobile device to a third party subscription cancellation provider platform via a platform-, language-, and cloud-agnostic subscription cancellation module;

calling, in response to granting the access, a first application programming interface received from the mobile operating system to retrieve and display a list of merchants with active subscriptions tied to the customer's card onto a graphical user interface within the customers' mobile device to cancel a corresponding active subscription;

calling, in response to granting the access, a second application programming interface received from the mobile operating system to allow cancellation of the corresponding active subscription;

receiving, in response to integrating, an input via the graphical user interface to select a merchant associated with the corresponding active subscription the customer wants to cancel; and cancelling, in response to receiving the input, the corresponding active subscription associated with the selected merchant by transmitting, via the second application programming interface, a cancellation request to the third party subscription cancellation provider platform over a network, wherein the second application programming interface is configured to receive a response from the third party subscription cancellation provider platform, and wherein a communication failure, timeout, or unsuccessful response associated with the second application programming interface indicates an inability to reach the merchant, and wherein, in response thereto, the platform-, language-, and cloud-agnostic subscription cancellation module identifies a token corresponding to the customer card and the selected merchant and transmits, via a network interface, a control message to a token service provider to modify a lifecycle state of the token or associate the token with a merchant-specific restriction that prevents authorization of subsequent transactions initiated by the merchant, such that future authorization requests involving the token are automatically declined, thereby blocking future payments from the customer card for the merchant.

14. The non-transitory computer readable medium according to claim 13, wherein the customer signed up for the online subscription directly from a merchant website associated with the merchant without going through an Appstore.

15. The non-transitory computer readable medium according to claim 14, in granting the access to the customer's card subscription payment details data, the instructions when executed, cause the processor to further perform the following:

adding the customer's card to a mobile wallet of the operating system.

16. The non-transitory computer readable medium according to claim 15, wherein the instructions, when executed, cause the processor to further perform the following:

receiving an acknowledgement message via the mobile device that the customer's card may be successfully added to the mobile wallet with an opt-in option that allows sharing the customer's subscription details data tied to the customer's card with the operating system; and receiving an input that the customer selected the opt-in option.

17. The non-transitory computer readable medium according to claim 13, wherein the instructions, when executed, cause the processor to further perform the following:

displaying on to the graphical user interface, in response to receiving the input to select the merchant whose subscription the customer wants to cancel, a cancelled workflow.

* * * * *